United States Patent [19]

Anderson et al.

[11] E Re. 30,959

[45] Reissued Jun. 8, 1982

[54] SCHEDULING BOARD

[76] Inventors: John S. Anderson; Virginia B. Anderson, both of Manor Hill Farm, 4600 Breidenbaugh La., Glenarm, Md. 21057

[21] Appl. No.: 679

[22] Filed: Jan. 3, 1979

Related U.S. Patent Documents

Reissue of:

[64] Patent No.: 4,003,150
Issued: Jan. 18, 1977
Appl. No.: 668,576
Filed: Mar. 19, 1976

[51] Int. Cl.[3] ..... G09F 3/20

[52] U.S. Cl. ..... 40/374; 434/108; 40/109; 40/124.2; 116/323

[58] Field of Search ..... 40/373, 374, 490, 585, 40/124.2, 124.4, 124, 107, 109, 122, 16.4, 19.5, 618; 35/24 A, 24 R; 116/323, 321, 322

[56] References Cited

U.S. PATENT DOCUMENTS

| | | | |
|---|---|---|---|
| 1,507,099 | 9/1924 | Wood | 40/585 |
| 1,511,750 | 10/1924 | Rand | 40/374 |
| 1,554,466 | 9/1925 | Stratton | 35/24 R X |
| 1,695,328 | 12/1928 | Gordon et al. | 40/405 |
| 1,880,165 | 9/1932 | Winzeler | 40/119 |
| 2,797,511 | 7/1957 | Zecher | 40/611 |
| 2,944,355 | 7/1960 | Park inson | 35/24 A X |
| 2,994,296 | 8/1961 | Waldin | 116/323 X |
| 3,237,329 | 3/1966 | Martin | 40/124.2 |
| 3,838,529 | 10/1974 | Aybar | 40/585 |

FOREIGN PATENT DOCUMENTS

| | | | |
|---|---|---|---|
| 427289 | 4/1935 | United Kingdom | 40/124.2 |

*Primary Examiner*—John F. Pitrelli
*Attorney, Agent, or Firm*—Laurence R. Brown

[57] ABSTRACT

A scheduling board providing for the orderly listing of jobs or operations scheduled and/or contracted to be performed and the progress thereof in relation to the time allotted to each for their completion, said board incorporating an elongate, relatively narrow-width slideway extending along one side edge thereof for the reception of a plurality of discrete "day-date" tabs arranged in column formation therein, and further incorporating a wider channel disposed to the side of said slideway adapted to be filled with a multiplicity of transversely extending semi-rigid strips inscribed on their face with job or operation data, the vertical height of each of said strips being a known fraction of the vertical height of the day-date tabs, said column of day-date tabs being slidable upwardly in response to upward push force applied to the lowermost or lower tabs upon each uppermost tab having been removed from the slideway, and said topmost strip(s) being manually liftable from said channel by bowing force applied from beneath same to their middle-length portions, whereupon all lower strips may be slid upwardly in said channel to fill the space previously occupied by the strip or strips which have been removed.

14 Claims, 3 Drawing Figures

FIG. 2
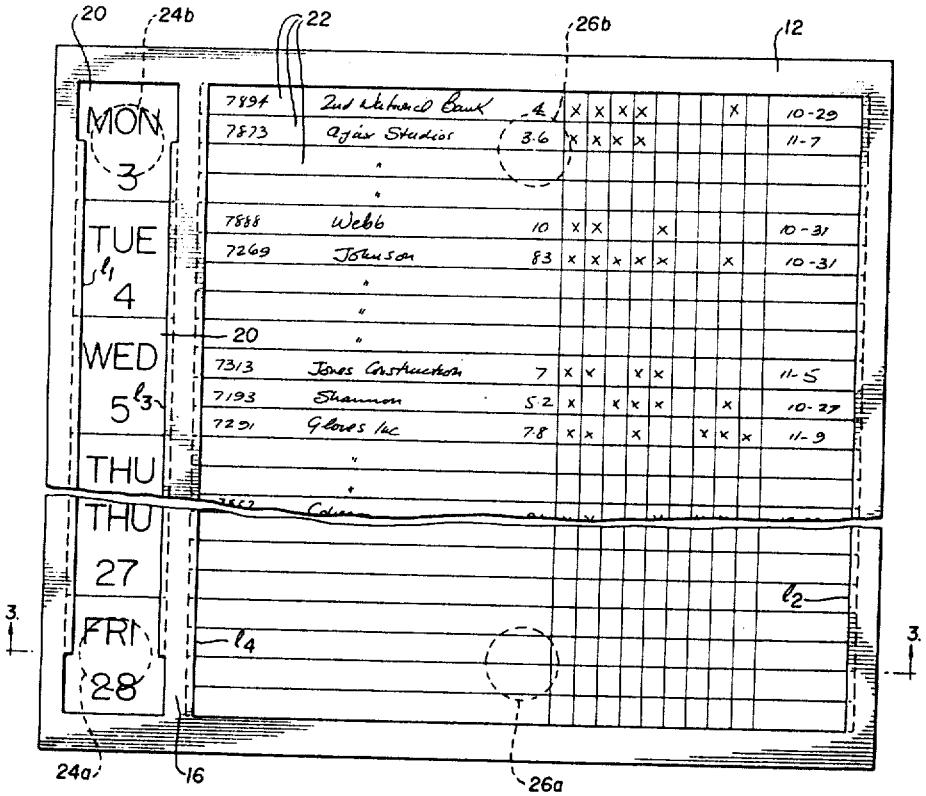
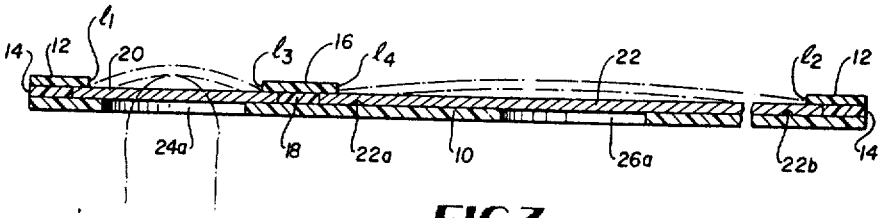
FIG. 3

SCHEDULING BOARD

Matter enclosed in heavy brackets [ ] appears in the original patent but forms no part of this reissue specification; matter printed in italics indicates the additions made by reissue.

THE INVENTION—IN GENERAL

This invention relates to improvements in scheduling boards as the term is used herein to define boards providing a visual listing of jobs or operations scheduled and/or contracted to be undertaken and the progress thereof in terms of time alloted thereto by a scheduler, i.e. the person charged with the duty of scheduling said jobs or operations.

OBJECTS OF THE INVENTION

Broadly stated, a major object of the invention is the provision of an improved, simplified and highly effective job or operation scheduling board which provides a visual listing of jobs or operations scheduled to be undertaken and the progress thereof in terms of the time allotted for their completion.

Among the more specific objects of the invention may be noted the provision of a job or operation scheduling board as aforesaid for use in various situations and/or operations wherein followup and/or priority listings may be required or useful.

Yet a more detailed object of the invention is the provision of a job or operation listing board wherein job or operation listings may be shifted or interchanged as may be deemed necessary or advisable to the scheduler, with or without reference to the time earlier alloted for completing same.

Still another practical object of the invention is a job or operation scheduling board which may be laid out and viewed flat or hung in a suspended position and which further may be easily duplicated on office copying machines for such distribution of copies thereof as may be required or considered advisable, as well as for storage for a permanent recording of same.

Yet another object of the improved scheduling board according to the invention is the provision of a job or operation listing board characterized by the ease with which the purging of obsolete information thereon may be accomplished, thus insuring a board whose listings or entries are live and pertinent.

The above and other objects of the invention will be more fully apparent and understood from a consideration of the following detailed description of a preferred form of scheduling board of the invention, wherein . . .

FIG. 2 is a broken-away (foreshortened in lengthwise direction) view on an enlarged scale as compared to that of FIG. 1, of a scheduling board as illustrated in FIG. 1; and FIG. 3 is a section taken on a transverse plane 3—3 of FIG. 2, illustrating in dot-dash lines the manner of removing obsolete information from a scheduling board according to FIG. 1.

Figure 1:
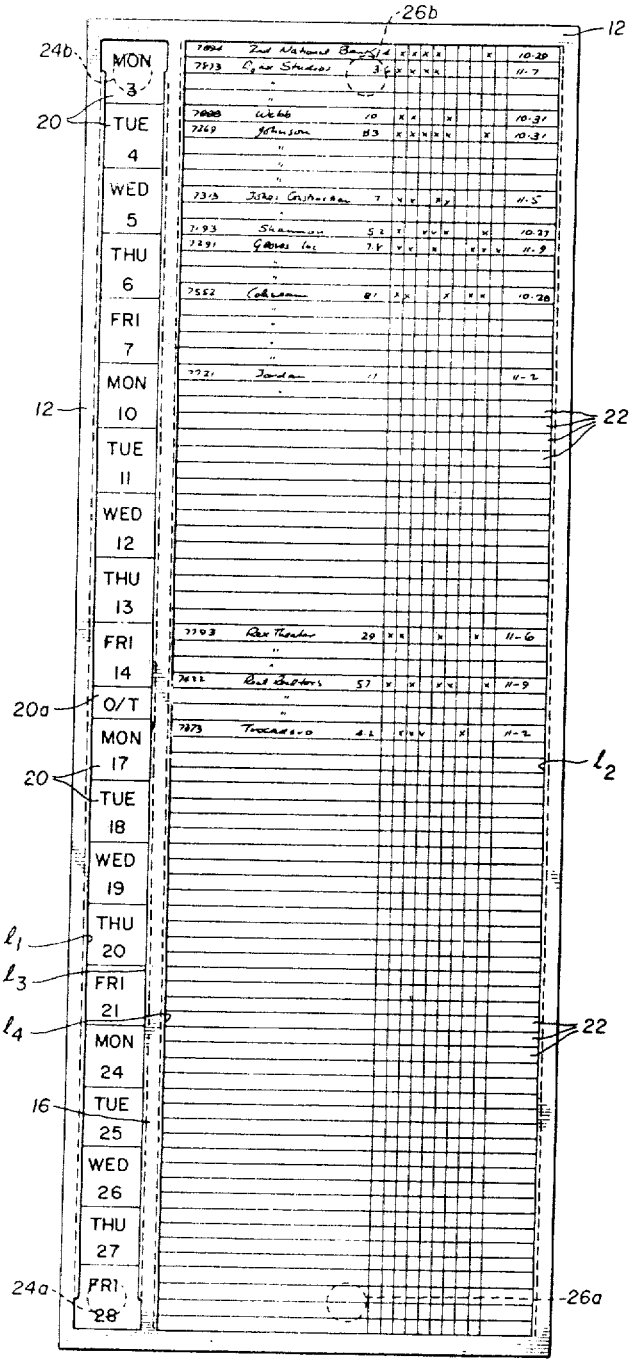
FIG. 1 is a plan view looking on to a scheduling board of the invention listing jobs or operations scheduled to be undertaken during each day of the four five-day work weeks of a typical work month, illustratively a month of working days beginning Monday the third, and terminating Friday the twenty-eighth.

Referring to the drawing figures in detail, a job or operation listing and/or scheduling board of the invention comprises a vertically elongate, planar, rigid board 10 of rectangular configuration preferably fashioned from a suitable thermoplastic material and which is framed along all four of its edges by a one-piece rectangular planar frame member 12 preferably formed as by stamping same from rigid plastic sheet material, and which is spaced forwardly from the planar face of the aforesaid board a distance approximately equal to the thickness of the day-date tabs and elongate strips (to be hereinafter described) by a spacer member 14, also of one-piece frame-like configuration, whose outer edges are vertically aligned with the outer edges of both said board 10 and said frame member 12. However, it is a feature of the invention that the width of at least the longitudinal side edge portions of the spacer member 14 is slightly less than the width of the overlying longitudinal side edge portions of the outer or main frame 12, with the result that, as seen in FIG. 3, the longer side edges of the outer or main frame 12 extend laterally (relatively inwardly) beyond the corresponding longitudinal side edges of the spacer member 14, thus to form overhanging lips $l_1$ and $l_2$.

Said outer frame and spacer 12, 14 respectively are of course secured fast to one another and to the outer planar face of the board 10 by cementing/or fusing said parts together in the relationship best seen in FIG. 3, with the desirable result that the framed board is capable of being handled and used as can any rigid planar elongate rectangular article.

In addition to providing what may be termed a double-thickness frame extending along the outer edges of the board 10, said outer frame 12 and its spacer member 14 are each additionally provided in their fabrication with vertically extending divider parts 16, 18 disposed intermediate the longitudinal side edges of the board and which extend the full length of the interior space of the board bounded by the frame proper and which define with the left edge frame portion a vertical track- or slide-way extending along and for the length of the left-side edge of the board and a substantially wider channel extending between the divider and the right-side edges of the board. According to the invention, the width of said slideway is such as to accomodate with sliding clearance a plurality of separate and discrete "day-date" tabs 20 arranged in vertical column formation, . . . which tabs are so termed because each is inscribed with writing or data representative of the consecutive work days and dates thereof of the four five-day work weeks in a typical month starting Monday the third, and ending Friday the twenty-eighth of said month.

FIG. 3 also illustrates that both longitudinal edges of the outer frame component of said vertical divider 16, 18 overhang the corresponding longitudinal edges of the spacer component 18 of the said divider by a small amount, thus forming overhanging lips $l_3$ and $l_4$, of which the longitudinal lip $l_3$ cooperates with the aforementioned lip $l_1$ and the longitudinal lip $l_4$ cooperates with the aforementioned lip $l_2$ in providing overhanging retention flanges for the aforementioned column of day-date tabs 20 in the slideway, and also for a multiplicity of transversely elongate semi-rigid strips 22 inscribed in their outer face with job and/or operation data and which fill the wide space (hereinafter termed the channel) of the board 10 extending between the vertically disposed divider 16, 18 and the frame portion extending along the boards's right edge.

It is a further special feature of the invention that, while the width dimension of day-date tabs 20 is not unduly critical (although preferably this width is the same as the height dimension thereof), the vertical height of said tabs 20 is critical in the sense that the height of all said day-date tabs is the same and is a fixed multiple of the vertical height of the elongate semi-rigid strips 22 inscribed with job or operation data.

More particularly, in the case of the board being described the vertical height of each of the elongate strips 22 is one-fourth that of the height of each day-date tab 20, so that the total vertical height of four of the strips will equal the vertical height of one day-date tab. Accordingly, assuming each day-date tab 20 represents an 8-hour work day, each of the horizontally elongate job or operation-inscribed strips 22 represents two hours of scheduleable time and hence the person having the duty of scheduling will know in advance that he must use one elongate strip 22 for each 2-hour work period. Thus, if a particular job or operation is alloted 4 hours of work time, then two elongate strips 22 are inserted in the channel board space between the lips $l_4$ and $l_2$ which lies laterally opposite the day-date tab 20 for the day then being scheduled. And if 6 hours should be allotted for the next job or operation, then three strips will be so placed, and so on.

If more than one strip must be so used, i.e. alloted to a particular operation, only the uppermost one need by inscribed with the job or operation data, the strips under said uppermost one being left blank or they may be inscribed with the "ditto" marking. Of course, the schedular may inscribe every elongate strip allotted to a particular operation, should he think same necessary in a particular case.

The job or operation inscribed strips 22 can be readily inserted in their proper order in the channel by slightly bowing the same from beneath and threading their two ends beneath the aforesaid overhanging lips $l_4$ and $l_2$, which later function both as guide-retaining flanges therefor. As an added precaution insuring retention of said strip ends when so placed, said ends are preferably longitudinally scored on their under faces as indicated at 22a, 22b (FIG. 3). To facilitate removal of the said so retained strips, the board may be provided with top and bottom finger push-openings 26b 26a respectively.

Reverting to the day-date tabs 20, a unique structural feature thereof when said tabs are considered collectively resides in the face that said tabs are planar and are arranged not only in column formation as previously mentioned, but more particularly they are arranged in top and bottom horizontal edge-abutting relationship. That is to say, the top horizontal edge of each lower tab 20 is in direct abutting engagement with the bottom horizontal edge of each upper tab. Thus, when the stiff, planar nature of all said tabs 20, the retaining action of the lips $l_1$ and $l_3$ on the side edge portions of the tabs and the smooth planar surface of the board 10 on which the tabs of the column are adapted to move vertically as aforesaid are considered, it will be appreciated that an upward push force applied to the lower-most tab of the column, for example, will be transmitted not only to the next higher tab but to all higher tabs of the column, due to the aforesaid top edge-to-bottom-edge abutting engagement of tab on tab.

The topmost day-date 20 may be readily removed from the slideway at an appropriate time at or near the end of each working day by finger or tool pressure exerted on its under side through a hole 24B provided in the board. A hole 24A similar to said hole 24b may be provided at the bottom of the tab slideway if such is desired, said hole 24a assisting the scheduler in properly placing or inserting a replacement tab in said slideway. To facilitate topmost tab removal and insertion of a replacement tab at the bottom end of the slideway, the lips $l_1$, $l_3$, rather than extending fully to the slideway top and bottom ends, are terminated a short distance therefrom as widens the slideway for short-length top and bottom end portions thereof.

In use of the scheduling board of the invention, the person whose duty is that of scheduling jobs or operations to be performed in proper order inscribes the outer face of a single upper strip and/or a plurality thereof with the particular job or function data to be performed and inserts the proper number of elongate strips 22 allotted thereto in the board channel.

When said channel which is of height providing for the accommodation of a multiplicity of said strips 22 is filled, all of the job or operation strips with their properly inscribed data will be opposite their estimated future dates of completion as indicated by the tabs in the slideway.

In continuing use thereof, near the end of each work day the scheduler will (1) remove the topmost day-date tab 20, as such is now obsolete; (2) slide the column of day-date tabs upwardly, thus bringing the next current day-date tab to the topmost position previously filled by the just removed tab; (3) add a new consecutively dated day-date tab to the bottom of the slideway; (4) from data on hand update the job or operation channel by removing the strips 22 which are representative of that part of the job or operation which was accomplished from the top of the channel, but allowing to remain those strips which indicate how much "work time" is left to be done for that particular operation; and (5) slide the plurality of strips upwardly in the channel until all gaps are filled. Thus, immediately all of the previously listed job or operation strips are oriented against the proper day-date tab in the slideway, thereby indicating the progress that has been made in completing the topmost listed items. Any schedule changes, caused by more or less work having been done that allotted or expected, will now become known to the scheduler.

At any time during the day, the job or operation channel can be further adjusted by the scheduler to reflect the addition of any new job-inscribed strips listing priority operations, cancelations, postponements, etc. of jobs or operations, by removing strips inscribed with data pertaining thereto; shifting or transferring strips to new locations in the channel because of new date-of-completion priorities; adding or subtracting alloted time to or from already scheduled listings as by adding or removing strips from the channel, etc. After the scheduler has made any of the above changes, the re-arranged strips are slid to the top of the channel, whereupon all jobs or operations are automatically date-oriented.

It is to be particularly noted that overtime day-date tabs can be inserted anywhere in the slideway if necessary to complete a job on a non-normal work day. Such overtime tab or tabs, one of which designated 20a inscribed with the overtime marking O/T is shown, are preferably color-coded or otherwise made to stand out from the other day-date tabs, whereby critical overtime potentials are clearly apparent to the viewer.

It is also to be noted that, whereas in the foregoing description the day-date tabs represent an 8-hour work day broken down into four 2-hour segments, such a relationship may be altered if considered advisable.

Without further analysis, it will be appreciated that a scheduling board according to the invention may be worked with convenience on a desk and may be there maintained for viewing or hung on a hanger for vertical reading if desired, or it may be stored for future reference. Further, it is a feature of the invention that a scheduling board as herein proposed is susceptible to being readily duplicated on office copying machines for copy distribution or for permanent recording thereof. Finally, a board set up and maintained or worked according to the invention is notable for the ease with which obsolete information, i.e. data or listings, may be purged therefrom, a feature of importance in insuring that all entries or listings carried by the board are live and current.

Having disclosed our invention, we make the following claims therefor:

1. A job or operation scheduling board providing a visual listing of a plurality of jobs, operations, etc. scheduled or contracted to be undertaken and the progress thereof in relationship to the time allotted to each for their completion, comprising:

an elongate rectangular planar board of rigid material, means providing with the planar outer face of the board a relatively narrow-width vertical slideway extending along one side edge thereof and for substantially the full length of said side edge, a plurality of discrete planar tabs of equal vertical height and having horizontal top and bottom edges arranged in column formation in said slideway and with said edges disposed in abutting relationship, said tabs being inscribed on their outer planar faces with markings indicative of the days of a normal work week and the consecutive dates of a plurality of such working days within a specified time such as a month, means providing with the planar outer face of said board a channel of substantially greater lateral dimension than that of said slideway and extending from said slideway to the opposite side edge of the board and a multiplicity of transversely elongate semi-rigid strips normally disposed in top-to-bottom edge engagement in said channel and being inscribed on their outer faces with job or operation data, the vertical height of said strips being a known fraction of the vertical height of any one of said tabs whereby the total vertical height of a plurality of said strips equals the vertical height of one or more tabs of the vertical column thereof, means normally retaining both the tabs and elongate strips in slidable engagement on the outer planar face of the board, the tabs being slidable upwardly in the slideway as a column upon removal of the topmost tab and said topmost strips being each manually liftable from the channel in response to bowing force applied to their middle length portions from beneath same whereupon all lower strips may be slid upwardly in their channel to positions filling the space or spaces previously occupied by said topmost strips.

2. A job or operation scheduling board according to claim 1, wherein said planar day-date inscribed tabs are fashioned from a material capable of transmitting vertical force from one to the other in their common plane.

3. A job or operation scheduling board according to claim 1, wherein said board is provided with means adjacent at least its top edge providing finger-access openings to the under faces of said uppermost tab and strips.

4. A job or operation scheduling board according to claim 1, wherein said board is framed along all of its edges by means comprising a one-piece planar stamping configured as a frame.

5. A job or operation scheduling board according to claim 4, wherein said frame is spaced outwardly from the planar face of the board by a one-piece planar stamping serving as a frame-spacing member.

6. A job or operation scheduling board according to claim 5, wherein said frame and spacer are each formed with an integral, vertically extending divider leg which together define one side edge of the slideway and one side edge of the channel.

7. A job or operation scheduling board according to claim 6, wherein the longitudinal side edges of the frame proper and its divider overhang the corresponding side edges of said frame spacing member and its divider leg, thereby forming tab and strip retention flanges.

8. A job or operation scheduling board according to claim 7, wherein the tab-slideway retention flanges terminate short of both the top and bottom ends of the slideway by amounts facilitating the removal of the topmost tab therefrom and the insertion of a replacement tab therein.

*9. A scheduling board for providing a visual listing comprising:*

*a planar board of rigid material having a planar outer face, means providing the planar outer face a relatively narrow-width slideway, a plurality of discrete planar tabs having top and bottom edges arranged in column formation in said slideway with said edges disposed in abuttable relationship, said tabs being inscribable with indicia on their outer planar faces, means providing on the planar outer face of said board a channel of substantially greater lateral dimension than that of said slideway with one side proximal to and parallel with said slideway, a multiplicity of transversely disposed elongated semi-rigid strips slidably disposed in top-to-bottom relationship in said channel, said strips being inscribable with indicia on their outer faces, the vertical height of said strips being a known fraction of the vertical height of any one of said tabs whereby the total vertical height of a plurality of said strips equals the vertical height of one or more tabs, and means retaining both the tabs and the strips in vertically slidable engagement on the outer face of the board.*

*10. The board of claim 9 wherein the tabs and strips are slidable upwardly in the slideway as a column upon removal of the topmost tab.*

*11. The board of claims 10 or 14 wherein the board is provided with means adjacent at least its uppermost tab providing finger-access openings to the under face of the uppermost tab and uppermost strips.*

*12. The board of claim 9 wherein a divider leg defines one edge of the slideway and one side edge of the channel.*

*13. The board of claim 12 wherein said means retaining the tabs comprises retention flanges which terminate short of both the top and bottom ends of the slideway by amounts facilitating the removal of the uppermost tab therefrom and the insertion of a replacement tab therein.*

*14. The board of claim 9 wherein the uppermost strips are manually liftable from the channel in response to a bowing force applied to their middle length portions from beneath same whereupon all lower strips may be slid upwardly in their channel to positions filling the space previously occupied by said uppermost strips.*

* * * * *